US005589907A

United States Patent [19]
Hozumi et al.

[11] Patent Number: 5,589,907
[45] Date of Patent: Dec. 31, 1996

[54] CAMERA HAVING AN INFORMATION SETTING APPARATUS FOR SETTING PHOTOGRAPHIC DATA

[75] Inventors: Toshiaki Hozumi, Tokyo; Hidehiro Ogawa, Funabashi, both of Japan

[73] Assignee: Nikon Corporation, Tokyo, Japan

[21] Appl. No.: 497,710

[22] Filed: Jun. 30, 1995

[30] Foreign Application Priority Data

Sep. 7, 1994 [JP] Japan ................................. 6-213635

[51] Int. Cl.$^6$ .................................................. G03B 17/00
[52] U.S. Cl. ........................................... 396/287; 396/297
[58] Field of Search ............................... 354/441, 442, 354/443, 444, 445, 486, 289.1, 289.12

[56] References Cited

U.S. PATENT DOCUMENTS 5,128,704  7/1992  Hayashi et al. .................... 354/289.1

Primary Examiner—Howard B. Blankenship

[57] ABSTRACT

A camera including an information setting apparatus, that increases or decreases the setting value by discriminating between two different signal phases generated in response to the setting of photographic information. A rotational direction changing setting section, which is a determination unit that determines the direction to change values, is associated with the action of the information setting apparatus, whether in a normal or inverse mode. The camera further includes display units, which display the photographic information to be set in a viewfinder of the camera and on a top portion of a camera body of the camera. In addition, a central processing unit selects whether or not the displays on the display units are indicated through digital signals.

17 Claims, 6 Drawing Sheets

CAMERA HAVING AN INFORMATION SETTING APPARATUS FOR SETTING PHOTOGRAPHIC DATA

BACKGROUND OF THE INVENTION

1. Field of the Invention

The present invention relates to a camera having an information setting apparatus and, more particularly, to a camera having an information setting apparatus that is suitable for use in setting photographic information of the camera, such as shutter speed, etc.

2. Description of the Related Art

Cameras are well known which have an information setting apparatus including a dial with a built-in substrate patterned with a code that comprises multiple bits. The dial is used to set the information marked with numerical values in each increment, for example, 1/125, 1/250, and 1/500, as a shutter speed, or f2, f2.8, f4, f5.6, as an aperture.

Additionally, a method is known, wherein a liquid crystal display element is used to sequentially change the information related to each increment that has been previously set by changing a counter output by rotation of the dial or by pressing a button for the values that are displayed on the liquid crystal display and stopping the action at the value to be selected.

As for conventional cameras, the direction of rotating the dial to set the information is determined within each camera in relation to the information to be set. In other words, there is no particular rule regarding the direction to rotate the setting dial, and either one of the directions of rotation may be predetermined for each individual camera type.

Ordinary photographers usually use only one camera and they get accustomed to the correlation between the direction of rotating the dial to set the information and the information to be set, rarely resulting in any problems. However, a professional photographer who uses several cameras has operational difficulties in setting the various information for photography. In addition, changing cameras causes all users trouble. This is due to the user's experience with a previous difficult camera having different information setting increments. Therefore, a problem arises when a user sets information in a different camera from the one previously used by the user, resulting in a demand for standardization of the operation of the cameras.

However, standardization of the operation for all types of camera is practically impossible, and prevents quick operation of information setting for photography. Especially for beginners and inexperienced users, this drawback makes the information setting operation more difficult and the problem of inefficient operation cannot be avoided.

Moreover, it is possible that the standardization of the operation would cause a problem of making some types of cameras overly large.

SUMMARY OF THE INVENTION

Accordingly, it is an object of the present invention to overcome the above-noted problems.

It is a further object of the present invention to provide an information setting apparatus for a camera that can easily execute a setting operation of information intended by a photographer.

It is another object of the present invention to provide an information setting apparatus for a camera, which displays a setting status thereof, without increasing the size of the information setting apparatus or decreasing the operability of the same.

Additional objects and advantages of the invention will be set forth in part in the description which follows and, in part, will be obvious from the description, or may be learned by practice of the invention.

Objects of the present invention are achieved by providing a camera having an information setting apparatus equipped with an information setting unit which increases or decreases a setting value by discriminating between two different signal phases generated in response to the information setting for photography, and a determination unit to determine a change of the setting value associated with the action of the information setting unit, in either a normal or inverse manner.

Objects of the present invention are further achieved by the above camera, wherein the information setting apparatus is further equipped with a first display unit inside a viewfinder of the camera to display the photographic information that has been set, a second display unit facing a top surface of the camera to display the photographic information, and an indication unit to indicate whether or not the first and second display units are displaying the photographic information by using digital signals. The displays are of the setting values of the photographic information on the first and second display units changed in either a normal or inverse manner that has been determined by the determination unit based on the indication from the indication unit.

The information setting for photography which increases or decreases the setting value associated with the operation of the information setting unit is performed by the determination unit to determine whether the change is made in a normal or inverse manner. For instance, when normal change is determined, normal change of information for photography is performed, and when an inverse change is determined, inverse change of the displays of information for photography is performed.

Accordingly, the first and second display units display the information setting for photography associated with the operation of the information setting unit, and a determination unit which determines the change to be made in either a normal or inverse manner. When normal change is determined, normal change of display of information for photography is performed by the first and second display units, and when inverse change is determined, inverse change of the display of information for photography is performed by the first and second display units.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
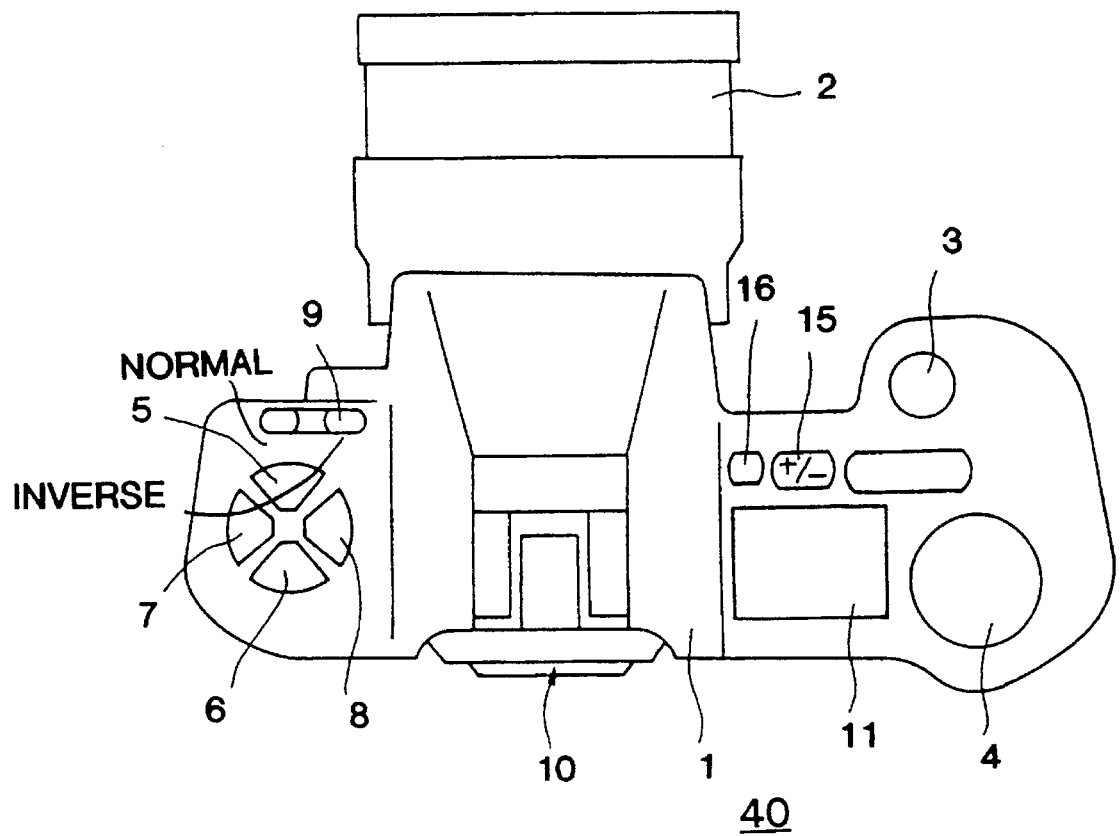
FIG. 1 is a top view of a camera with an information setting apparatus according to an embodiment of the present invention.

Reference will now be made in detail to a present preferred embodiment of the present invention, examples of which are illustrated in the accompanying drawings, wherein like reference numerals refer to like elements throughout.

FIGS. 1 through 8 show an embodiment of an information setting apparatus for a camera relating to the present invention. In these figures, the schematic structure of the entire camera will be briefly described below using FIG. 1, which is a top view of an external structure of a camera, and FIG. 2, which is a block diagram for the central processing unit (CPU) area for camera control.

In FIG. 1, a camera 40 has a camera body 1, and a protruding lens barrel 2 is connected to a center-front portion of the camera body 1. The protruding lens barrel 2 holds an optical system, not shown in this drawing, for photography.

The top pan of the camera body 1 includes a release button 3, a revolving setting dial 4 called a command dial, setting buttons 5 through 8 for various information settings, and a rotational direction changing switch 9.

An in-viewfinder liquid crystal display (LCD) 10, which is a first display unit inside a viewfinder, is provided on the upper back portion of the camera body 1, and an external liquid crystal display (LCD) 11, which is a second display unit, is provided on one side of the top part of the camera body 1.

Adjacent to the external LCD 11 is a compensation button 15 to compensate exposure, and adjacent to the compensation-button 15 is a rewind button 16 to rewind the film.

Setting button 5 is an operation button to switch exposure control modes, and the exposure control modes are changed between a program mode, a shutter speed priority mode, an aperture priority mode, and a manual mode, by rotating setting dial 4 while pressing setting button 5.

In addition, setting button 6 is an operation button to switch drive (feed) modes, and the drive modes are changed between consecutive shooting and single-frame shooting by rotating setting dial 4, while pressing setting button 6.

Furthermore, setting button 7 is an operation button to switch film speed, and the speed and DX setting of the film can be switched by rotating setting dial 4, while pressing setting button 7.

Setting button 8 is an operation button to set the synchronization mode, and it is possible to change or set the synchronization mode by rotating setting dial 4, while pressing setting button 8.

Rotational direction changing switch 9 makes it possible to select the effect on the setting information due to the direction of the rotation of setting dial 4. When the rotational direction changing switch in FIG. 1 is in the left position, the information setting apparatus is in a normal mode, resulting in the setting information increasing due to a clockwise (CW) rotation of the setting dial 4. When the rotational direction changing switch in FIG. 1 is in the right position, the information setting apparatus is in an inverse mode, resulting in the setting information increasing due to a clockwise (CW) rotation of the setting dial 4.

Here, the in-viewfinder LCD 10 is a display unit to display shutter speed, aperture, film exposure counter, focusing information, and comprises a liquid crystal display (LCD). Also, the external LCD 11 is a display unit to display shutter speed, aperture, film exposure counter, film speed, etc., and comprises a liquid crystal display (LCD).

Figure 2:
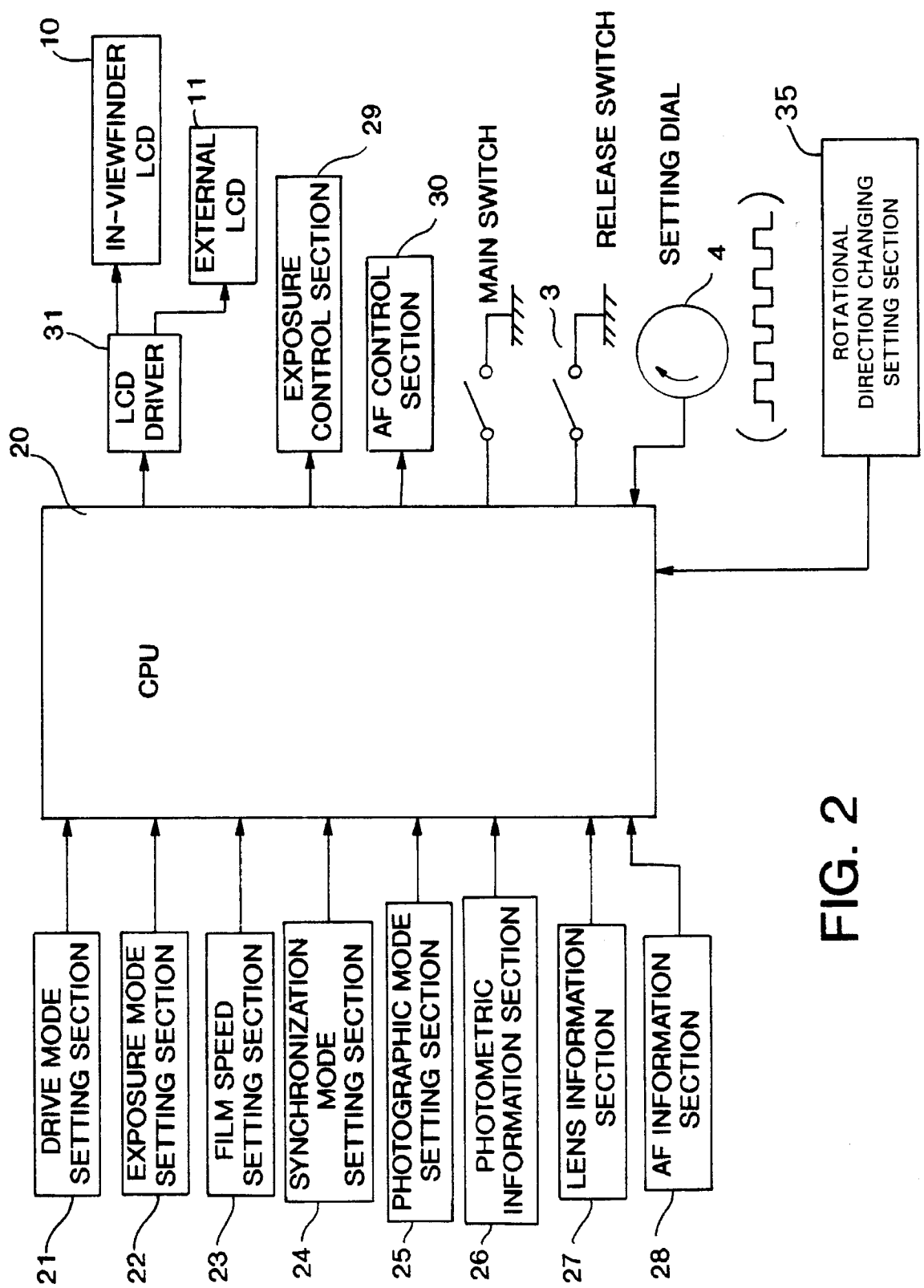
FIG. 2 is a schematic drawing describing a control system of a central processing unit (CPU) for the information setting apparatus of the camera shown in FIG. 1.

FIG. 2 shows a schematic structure of the entire control system relating to a CPU 20 that controls various photographic operations in the camera as shown in FIG. 1. The camera 40 includes a drive mode setting section 21, an exposure mode setting section 22, a film speed setting section 23, a synchronization mode setting section 24, and a photography mode setting section 25. Also, the information for the drive modes, exposure control modes, film speed, multiplex mode, and photography control mode, which have been set by rotating setting dial 4 while pressing the corresponding setting buttons 5–8 in FIG. 1, are input to the CPU 20 through the corresponding setting sections 21–25.

Photometric information section 26 measures the brightness of a subject to be photographed using a light receiving element, such as a silicon photo diode (SPD), and the result is then A/D converted and input to the CPU 20.

Lens information section 27 is where information output from the photography lens 2, such as the focal length, the maximum effective aperture, the minimum aperture value, etc., are input to the CPU 20. The autofocus (AF) information section 28 inputs information relating to the focus status to the CPU 20.

The exposure control section 29 is where the aperture and the action of the shutter, which are not shown in the figures, are controlled based upon instructions from the CPU 20. The AF control section 30 drives a photographic lens by a motor, both of which are not shown in the figures, according to instructions from the CPU 20, thereby guiding the photographic lens to the proper focusing position. LCD driver 31 receives display data from the CPU 20, and displays the information on the in-viewfinder LCD 10 or the external LCD 11 based upon the display data.

The rotational direction changing setting section 35 enters instructions for increasing the setting information by rotation of the setting dial 4 in either a clockwise (normal mode) or a counterclockwise (inverse mode) direction to the CPU 20 as described above.

Figure 3A:
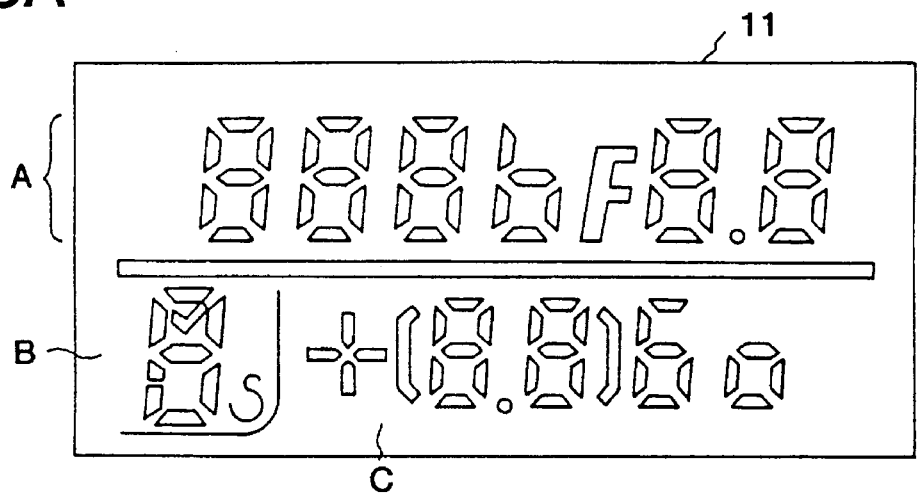
FIGS. 3A and 3B are schematic diagrams for all display statuses on an external liquid crystal display (LCD) and an in-viewfinder liquid crystal display (LCD), respectively of the information setting apparatus shown in FIG. 1.
Figure 3B:
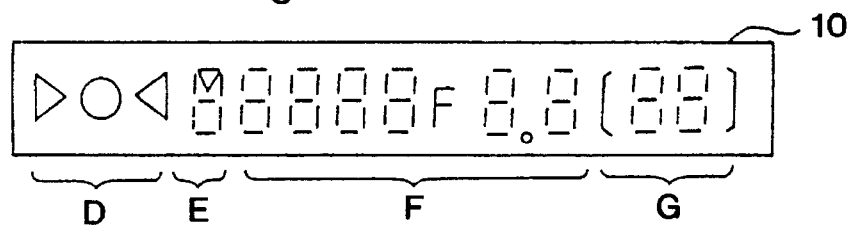

FIGS. 3A, 4A, 5A and 6A show displays on the external LCD 11, and FIGS. 3B, 4B, 5B and 6B show displays on the in-viewfinder LCD 10 for the information setting apparatus illustrated above. FIGS. 3A and 3B show examples where the entire segments of the respective displays are turned ON.

First, FIG. 3A shows a display where section A is for shutter speed and aperture settings, section B is for the exposure control mode, and section C is for the exposure compensation value, film speed, film exposure counter, and photography control mode.

FIG. 3B shows a display where section D is for focusing information for autofocus (AF), section E is for the exposure control mode, section F is for the shutter speed and the aperture settings, and section G is for the film exposure counter.

Figure 4A:
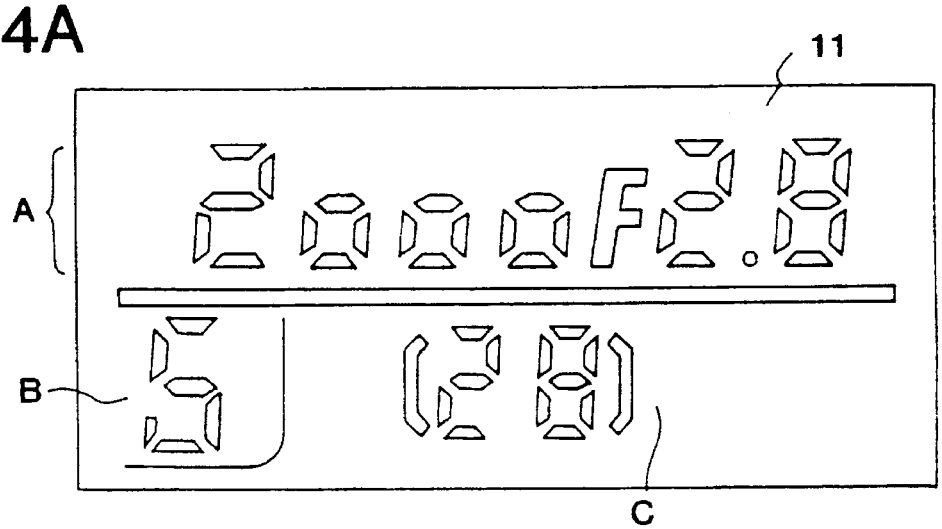
FIGS. 4A and 4B are top views of the respective displays shown in FIGS. 3A and 3B for various setting information conditions.
Figure 4B:
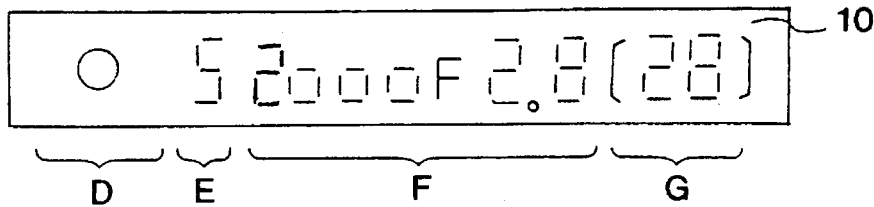

In FIG. 4A, the external LCD 11 shows that the shutter speed is 1/2000, the aperture is F2.8, the exposure control mode is shutter priority mode "S", and the film exposure counter is at 28. In FIG. 4B, the internal LCD 10 shows the same information as that shown on the external LCD 11 of FIG. 4A, namely, that the shutter speed is 1/2000, the aperture is F2.8, the exposure control mode is in the shutter priority mode, and the film exposure counter is at 28. A conventional display method is used to provide the displays shown in FIGS. 4A and 4B.

The CPU 20, also referred to as a control system, and the display units 10,11 perform in the following manner. Specifically, the information for brightness, which is A/D converted by the photometry information section 26, is calculated for exposure control in the CPU 20, and the information for display is sent to the LCD driver 31.

Here, when the rotational direction changing switch 9 is set for the normal mode (when clockwise rotation increases the setting information), a switch inside the dial 4, not shown in the figures, repeats ON and OFF states by the rotation of setting dial 4. Based on the input of the up-down signal to the CPU 20 which results from this ON/OFF action, when setting dial 4 is rotated clockwise, the setting value is set in the direction where "+1" Av or Tv value becomes larger for the APEX calculation (the APEX calculation is computations for determining shutter speed, aperture size and film sensitivity), and when setting dial 4 is rotated counterclockwise, the setting value is set in the direction where "−1" Av or Tv value becomes smaller for the APEX calculation.

Figure 5A:
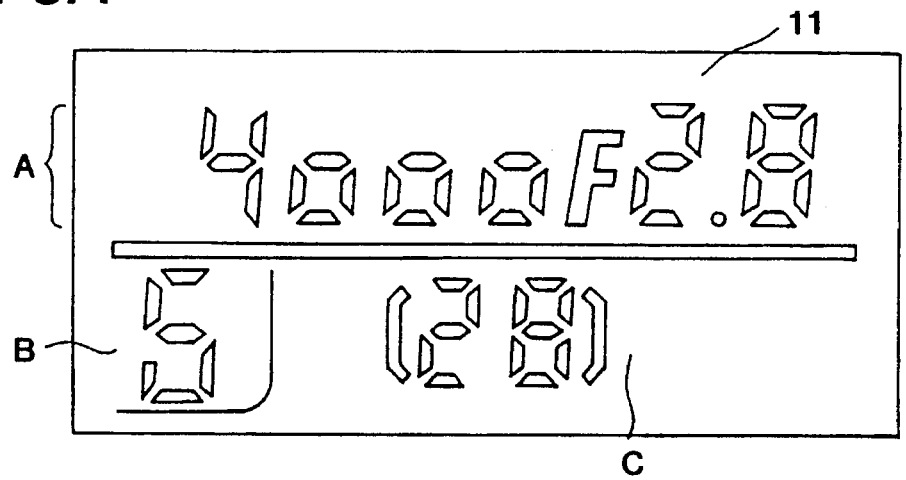
FIGS. 5A and 5B are top views of the respective displays shown in FIGS. 3A and 3B for various setting information conditions.
Figure 5B:
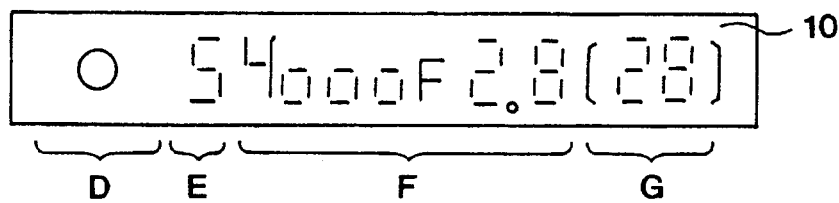

For example, the current status is as shown in FIGS. 4A and 4B, where the shutter speed is 1/2000, the aperture value is F2.8, the exposure control mode is a shutter priority mode S, and the film exposure counter is at 28. If setting dial 4 is rotated counterclockwise, the external LCD and in-viewfinder LCD "1/2000" turn to "1/4000", respectively, as shown in FIGS. 5A and 5B in this embodiment.

Figure 6A:
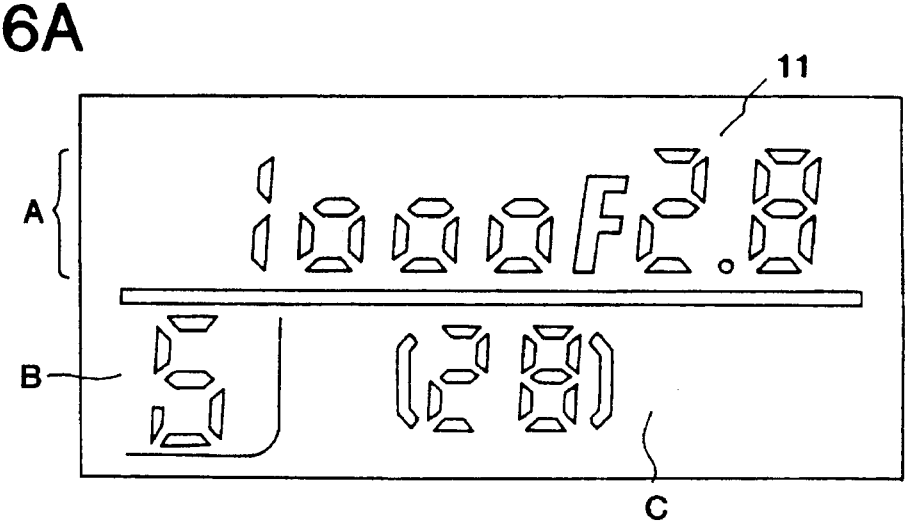
FIGS. 6A and 6B are top views of the respective displays shown in FIGS. 3A and 3B for various setting information conditions.
Figure 6B:
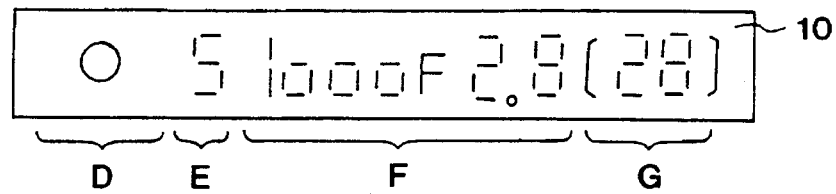

In contrast, if the dial is rotated clockwise, the displays change from "1/2000" to "1/1000", respectively, as shown in FIGS. 6A and 6B.

On the other hand, when rotation direction changing switch 9 is set for the inverse mode (when counter-clockwise rotation increases the setting information), a switch, inside the setting dial 4 and not shown in the figures, repeats ON and OFF states by the rotation of setting dial 4. Based on the input of the up/down signal to the CPU 20 which results from this ON/OFF action, when setting dial 4 is rotated clockwise, the setting value is set in the direction where "−1" Av or Tv value becomes smaller for the APEX calculation, and when setting dial 4 is rotated counterclockwise, the setting value is set in the direction where "+1" Av or Tv value becomes larger for the APEX calculation.

For example, the current status is as shown in FIGS. 4A and 4B where the shutter speed is 1/2000, the aperture value is F2.8, the exposure control mode is shutter priority mode, and the film exposure counter is at 28. In this instance, if setting dial 4 is rotated counterclockwise, the displays "1/2000" turn to "1/1000" as shown in FIGS. 6A and 6B, respectively, in this embodiment. In contrast, if the setting dial 4 is rotated clockwise, the displays change from "1/2000" to "1/4000", respectively, as shown in FIGS. 6A and 6B.

The operation and control of the camera equipped with the information setting apparatus with the above noted configuration will be described below using the flow charts in FIGS. 7 and 8.

Figure 7:
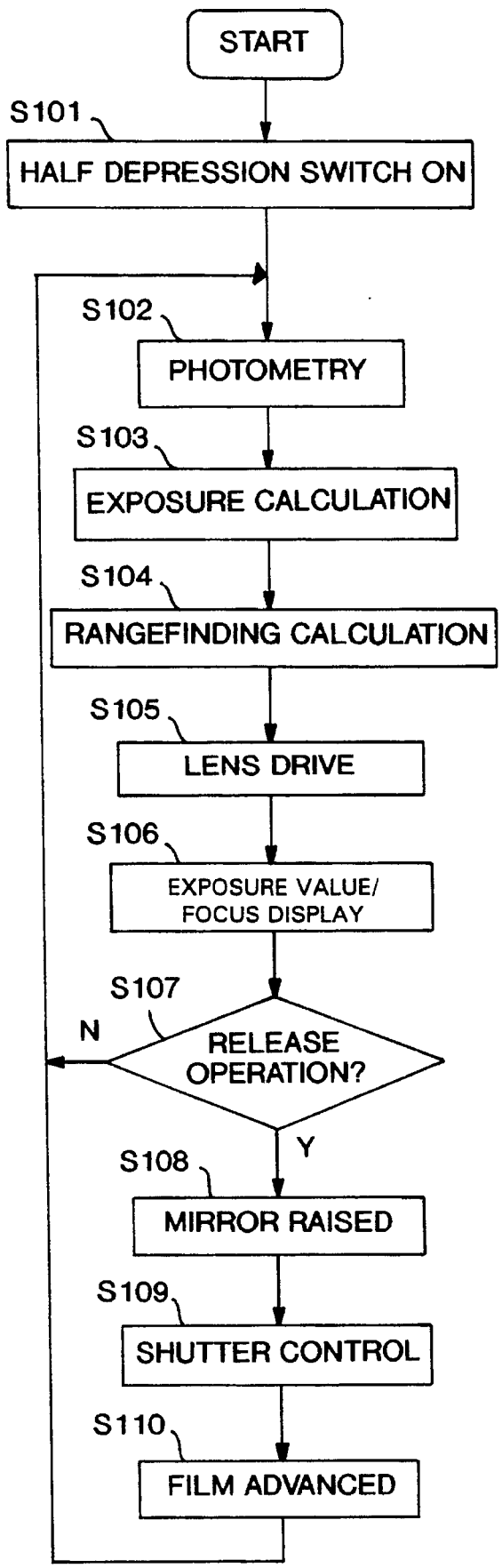
FIG. 7 is a flow chart showing a main routine in a photographic operation system of the CPU for the camera shown in FIG. 1.

FIG. 7 shows a main routine for the camera 40 shown in FIG. 1. FIG. 8 shows a process when setting dial 4 (a command dial) of the camera 40 is operated, and this process is performed as an interruption handling routine in the main routine. Each of the steps in FIGS. 7 and 8 is preceded with and referred to by the letter "S".

In S101, when the half-depression release button 3 of the camera is lightly pressed, that is, it is depressed half-way, the camera 40 turns ON. This half-way release corresponds to the main switch SW in FIG. 2.

First, photometry is performed by the light receiving element in S102. And then, in S103, the shutter speed and the aperture value, which are exposure values, are calculated based on the photometry value measured in S102.

Next, rangefinding is performed in S104, and then a lens of the camera 40 is driven in S105 based on the results of the rangefinding measurement in S104.

Then in S106, the results of the exposure calculation and the rangefinding results noted above are displayed on the external LCD 11 and the in-viewfinder LCD 10.

In S107, it is determined whether or not the release button 3 is firmly pressed, that is, whether or not a release operation (a full depression operation) has been executed. If the release operation is not performed, the process returns to S102, and the same process is repeated. If the release operation is determined to have been performed, the release action is performed at S108 and in the following steps.

That is, a mirror in the optical system of the camera, for reflecting light to a viewfinder, is raised in S108, thereby allowing light to irradiate film of the camera. The shutter control is activated, and photography action is performed in S109. Subsequently, in S110, the film is advanced by one frame and the process returns to S102.

Figure 8:
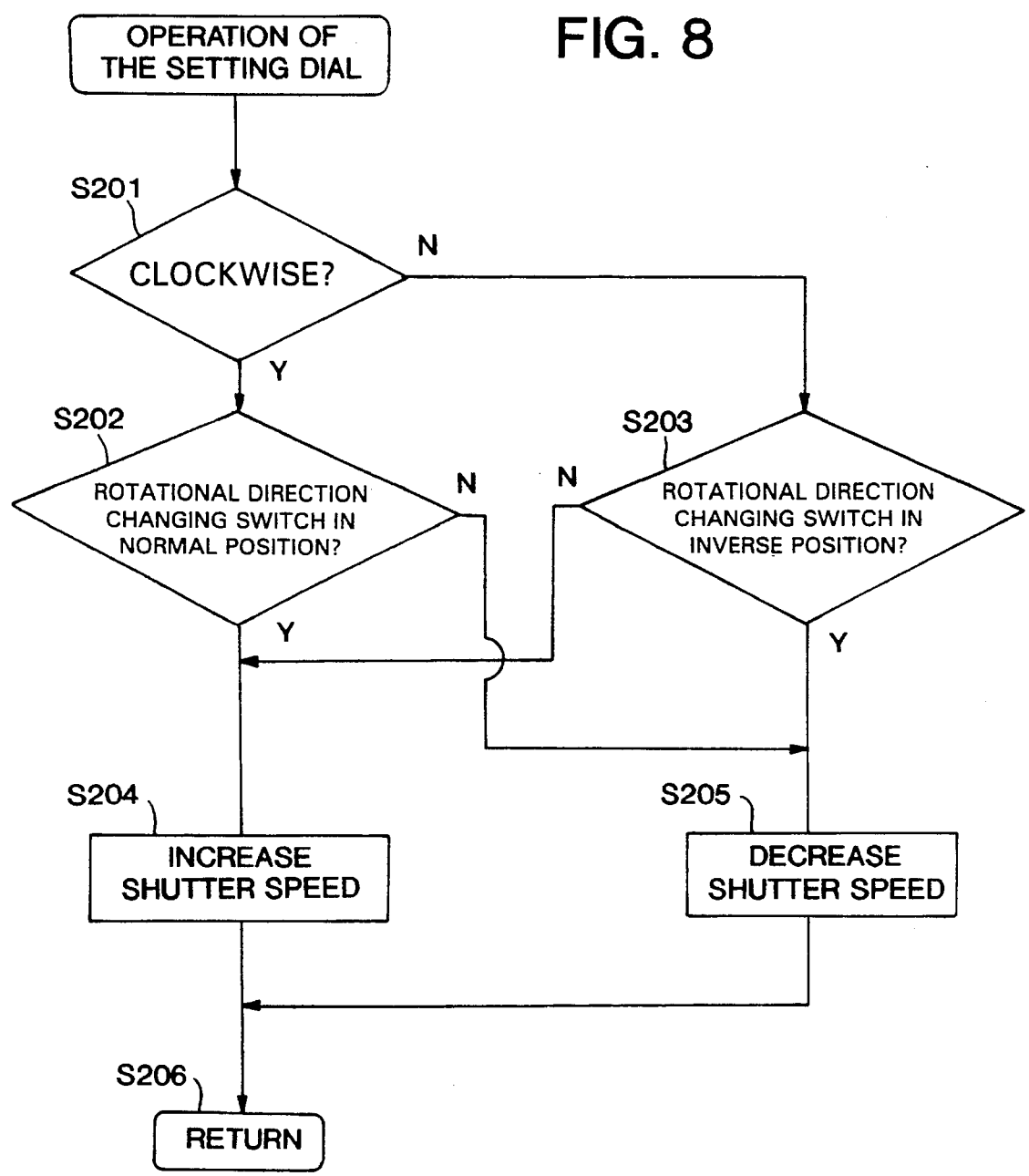
FIG. 8 is a flow chart showing a sub-routine when a setting dial of the information setting apparatus of the camera shown in FIG. 1 is operated.

FIG. 8 shows the process when setting dial 4 is operated. By operating setting dial 4, the process temporarily exits the flow from S102 to S106 in the main routine as shown in FIG. 7 and returns to the main routine after the process is completed.

Now the process to change the shutter speed using setting dial 4 will be described.

In S201, whether or not setting dial 4 is rotated clockwise is determined. If it is rotated clockwise, the process advances to S202, and if it is not, the process advances to S203.

In S202 and S203, the CPU 20 determines if rotational direction changing switch 9 in FIG. 1 is in either a normal position (indicative of the normal mode) or an inverse position (indicative of the inverse mode).

If rotational direction changing switch 9 is set for the normal mode in S202, or rotational direction changing switch 9 is not set for the normal mode in S203 (rather, set for the inverse mode), the process advances to S204. If rotational direction changing switch 9 is set for the inverse mode and not for the normal mode in S202, or rotational direction changing switch 9 is set for the normal mode in S203, the process advances to S205.

Then, the shutter speed increases to a higher speed in S204, or the shutter speed decreases to a slower speed in S205, and the process advances to S206, where the process returns to the main routine of FIG. 7.

In the above noted process in FIG. 8, the setting direction of the shutter speed is determined by the rotational direction of setting dial (command dial) 4, and the setting of rotational direction changing switch 9.

The external LCD 11 and the in-viewfinder LCD 10 are display units associated with the operation of the rotational direction changing setting section 35 in FIG. 2, the rotational direction changing setting section 35 including the information selection unit (setting buttons 5–8) and the rotational direction changing switch 9 to indicate the set direction using a digital signal. Rotational direction changing setting section 35 indicates whether the value in the APEX calculation will increase or decrease during the rotation, and this allows users to operate the camera in the same way as other cameras that they also use.

Particularly, with the preferred embodiment of the information setting apparatus according to the present invention, it is possible to alter the effect of rotation of setting dials of the cameras, and thus, the information setting apparatus is able to provide familiar operability.

In this example, only control of the shutter speed has been described; however, needless to say, this system can be applied to another function, such as aperture value, film speed, change of photometric mode, self-timer, data back (the process of placing information on film), etc.

Furthermore, the present invention is not limited to the embodiment described above, and it is possible to change the form and the structure of the camera including the information setting apparatus according to the necessary circumstances, and various modifications can be considered.

For instance, the style of rotational direction changing switch 9 is not limited to a slide switch as described in the example above, and various modifications, such as an up-down switch, a two-press button switch, or other variations may be applicable.

Also, in the above described embodiment, only the setting direction of the shutter speed has been described. However, embodiments of the present invention are not limited to this and needless to say, it can be applied to all the functions that can be set using setting dial 4 such as aperture value and exposure compensation, etc.

Furthermore, although rotational direction changing switch 9 is used in the preferred embodiment of the present invention, a non-volatile memory, etc., can also be used for setting information.

As described above, according to the preferred embodiment of the information setting apparatus for a camera relating to the present invention, an information setting unit, such as a revolving setting dial that increases or decreases the setting value by discriminating between two different signal phases generated in response to photographic information settings, is provided. A determination unit to determine a change of the setting value associated with the action of the information setting unit, whether to be changed in a normal or inverse manner, is provided, thereby achieving various excellent effects as noted below.

That is, embodiments of the present invention allows users to change the effect of particular rotational directions of setting dials, which adjust shutter speed, etc., thereby allowing the user to operate the camera in a way in which the user feels comfortable, and change the direction to the same way as the user's other cameras in the event that the user owns other cameras.

In other words, embodiments of the present invention solve conventional problems during the setting operation for various information when photographing with several cameras, without making a camera overly large and inefficient to operate, and allow photographers to operate settings easily, as intended.

Embodiments of this invention also provides photographers proper and accurate photography information through an in-viewfinder display unit or an external camera display unit, which are display units showing setting information for photography.

In addition, embodiments of the present invention provide a display unit to display the photographic information that has been set and an indication unit to indicate if the digital signal is to be used for the display, and is configured in such a way that the display of setting values of the information setting unit at the display unit is changed either in a normal or inverse mode which has been determined by a determination unit depending on whether or not the instruction has been provided by the indication unit, thereby further enhancing the above-mentioned operational effects despite the simplified configuration.

Furthermore, embodiments of the present invention allow the information setting status to be communicated to the photographer easily and properly by changing the display of the setting value on the display unit associated with the action of the information setting unit in a normal or inverse mode depending on whether or not the instruction is provided by the indication unit.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A camera having a setting value for photography, said camera comprising:

an information setting unit to increase and decrease the setting value of the camera through motion in first and second directions; and a determination unit having a normal mode and an inverse mode, wherein said determination unit causes said information setting unit to increase the setting value through motion in the first direction and decrease the setting value through motion in the second direction in the normal mode, and said determination unit causes said information setting unit to decrease the setting value through motion in the first direction and increase the setting value through motion in the second direction in the inverse mode.

2. The camera as claimed in claim 1, wherein said information setting unit is a revolving setting dial and said first and second directions are rotational directions.

3. The camera as claimed in claim 2, further comprising a display device to display the setting value of the camera.

4. The camera as claimed in claim 3, further comprising a camera body, wherein said display device is one of an in-viewfinder display unit and an external display unit at an external surface of said camera body.

5. The camera as claimed in claim 3, further comprising:

a camera body;

a viewfinder; and said display device comprises
an in-viewfinder display unit, to display the setting value in said viewfinder, and
an external display unit at an external surface of said camera to display the setting value.

6. A camera having setting values for photography, said camera comprising:

a selection unit to select one of the setting values to be adjusted;

an information setting unit to increase and decrease the one setting value selected by said selection unit through motion in first and second directions; and a determination unit having a normal mode and an inverse mode, wherein said determination unit causes said information setting unit to adjust the one setting value in one way in the normal mode and causes said information setting unit to adjust the one setting value in an opposite way in the inverse mode.

7. The camera as claimed in claim 6, wherein said determination unit causes said information setting unit to increase the one setting value through motion in the first direction and decrease the one setting value through motion in the second direction in the normal mode, and said determination unit causes said information setting unit to decrease the one setting value through motion in the first direction and increase the one setting value through motion in the second direction in the inverse mode.

8. The camera as claimed in claim 6, wherein:

said selection unit comprises setting buttons to select corresponding ones of the setting values; and said information setting unit comprises a setting dial to rotate in the first and second direction, wherein said setting dial adjusts the particular setting value corresponding to one of the setting buttons which is depressed simultaneously with the rotation of said revolving setting dial in one of the first and second directions.

9. The camera as claimed in claim 7, wherein:

said selection unit comprises setting buttons to select corresponding ones of the setting values; and said information setting unit comprises a revolving setting dial to rotate in the first and second direction, wherein said setting dial adjusts the particular setting value corresponding to one of the setting buttons which is depressed simultaneously with the rotation of said setting dial in one of the first and second directions.

10. The camera as claimed in claim 6, further comprising a display device to display the setting values of the camera.

11. The camera as claimed in claim 10, further comprising a camera body, wherein said display device is one of an in-viewfinder display unit and an external display unit at an external surface of said camera body.

12. The camera as claimed in claim 10, further comprising:

a camera body;

a viewfinder; and said display device comprises an in-viewfinder display unit to display the setting values in said viewfinder, and an external display unit at an external surface of said camera to display the setting values.

13. The camera as claimed in claim 7, further comprising:

a camera body;

a viewfinder; and a display device comprising an in-viewfinder display unit, to display the setting values in said viewfinder, and an external display unit at an external surface of said camera to display the setting values.

14. The camera as claimed in claim 7, further comprising:

a camera body;

a viewfinder; and a display device comprising an in-viewfinder display unit, to display the setting values in said viewfinder, and an external display unit at an external surface of said camera to display the setting values, wherein said external display unit and said in-viewfinder display unit simultaneously display all of the setting values.

15. The camera as claimed in claim 7, wherein said determination unit comprises a slide switch having first and second positions corresponding to the normal and inverse modes, respectively.

16. The camera as claimed in claim 7, wherein said determination unit comprises an up-down switch having first and second positions corresponding to the normal and inverse modes, respectively.

17. The camera as claimed in claim 7, wherein said determination unit comprises a two-press button switch having first and second positions corresponding to the normal and inverse modes, respectively.

* * * * *